United States Patent
Naidich et al.

(10) Patent No.: US 10,152,444 B1
(45) Date of Patent: Dec. 11, 2018

(54) SYNCHRONOUS LINK TRAINING

(71) Applicant: Apple Inc., Cupertino, CA (US)

(72) Inventors: Alexander Naidich, Cupertino, CA (US); David J. Redman, Fremont, CA (US)

(73) Assignee: Apple Inc., Cupertino, CA (US)

(*) Notice: Subject to any disclaimer, the term of this patent is extended or adjusted under 35 U.S.C. 154(b) by 10 days.

(21) Appl. No.: 15/275,314

(22) Filed: Sep. 23, 2016

Related U.S. Application Data

(60) Provisional application No. 62/348,765, filed on Jun. 10, 2016.

(51) Int. Cl.
  *G06F 13/40* (2006.01)
  *G06F 13/42* (2006.01)
(52) U.S. Cl.
  CPC ........ *G06F 13/4063* (2013.01); *G06F 13/405* (2013.01); *G06F 13/4027* (2013.01); *G06F 13/4045* (2013.01); *G06F 13/42* (2013.01); *G06F 13/4221* (2013.01); *G06F 13/4282* (2013.01); *G06F 13/4286* (2013.01)
(58) Field of Classification Search
  CPC ............. G06F 13/4027; G06F 13/4045; G06F 13/405; G06F 13/4063; G06F 13/42; G06F 13/4221; G06F 13/4282; G06F 13/4286
  See application file for complete search history.

(56) References Cited

U.S. PATENT DOCUMENTS

| | | | |
|---|---|---|---|
| 8,380,912 B2 | 2/2013 | Jaramillo | |
| 8,549,197 B2 | 10/2013 | Hall et al. | |
| 8,799,537 B1* | 8/2014 | Zhu | G06F 13/385 710/14 |
| 2008/0250186 A1* | 10/2008 | Suzuki | G06F 13/4027 710/313 |
| 2011/0265139 A1* | 10/2011 | Singh | H04N 21/64322 725/116 |
| 2012/0066425 A1* | 3/2012 | Zeng | G06F 13/14 710/303 |
| 2012/0079162 A1* | 3/2012 | Jaramillo | G09G 5/006 710/316 |
| 2014/0281108 A1 | 9/2014 | Pethe et al. | |
| 2015/0092065 A1 | 4/2015 | Radhakrishnan et al. | |
| 2015/0363350 A1 | 12/2015 | Yeung et al. | |
| 2016/0127671 A1* | 5/2016 | Hundal | G06F 13/4247 348/723 |
| 2017/0286348 A1* | 10/2017 | Kambhatla | G06F 13/4282 |

* cited by examiner

*Primary Examiner* — Glenn A. Auve
(74) *Attorney, Agent, or Firm* — Womble Bond Dickinson (US) LLP

(57) ABSTRACT

Information is provided to a source device during link training regarding the state of a remote link when an intermediate device using a different protocol is connected between source and sink devices. The intermediate device includes two controllers connected by a cable, the first controller being connected to the source device and the second controller being connected to the sink device. State information regarding the remote device may be provided by a state machine that stores data to a register on the intermediate device. Based on the state of the remote link, the source device is able to generate a representation of the end to end link between the source and sink device, and to perform link training accordingly.

24 Claims, 4 Drawing Sheets

SYNCHRONOUS LINK TRAINING

CROSS-REFERENCE TO RELATED APPLICATIONS

This application claims the benefit of U.S. Provisional Application No. 62/348,765 filed Jun. 10, 2016, the contents of which are hereby incorporated by reference as if fully stated herein.

FIELD

One aspect of the disclosure herein relates to techniques for establishing a connection between a DisplayPort source device and DisplayPort sink device.

BACKGROUND

The Video Electronics Standards Association (VESA) DisplayPort standard defines a system and apparatus capable of transporting video, audio and other data between a source device and a sink device over a communications interface. The DisplayPort standard addresses internal connections such as interfaces within a personal computer or monitor. In addition, the DisplayPort standard addresses external display connections, including interfaces between a personal computer and a monitor or projector, between a personal computer and a television, or between a device such as a digital versatile disk player and a television.

When a physical connection is established between a DisplayPort source device and a DisplayPort sink device, link training is performed through a handshake in an attempt to establish the bandwidth and electrical parameters of the transmission channel, including number of lanes, transmission rate, drive current and equalization level. The source device performs link training to configure a link based on a number of factors, including the sink device capabilities and source device capabilities.

BRIEF DESCRIPTION OF THE DRAWINGS

The embodiments herein are illustrated by way of example and not by way of limitation in the figures of the accompanying drawings in which like references indicate similar elements. It should be noted that references to "an" or "one" embodiment in this disclosure are not necessarily to the same embodiment, and they mean at least one. Also, in the interest of conciseness and reducing the total number of figures, a given figure may be used to illustrate the features of more than one embodiment, and not all elements in the figure may be required for a given embodiment.

DETAILED DESCRIPTION

Figure 1:
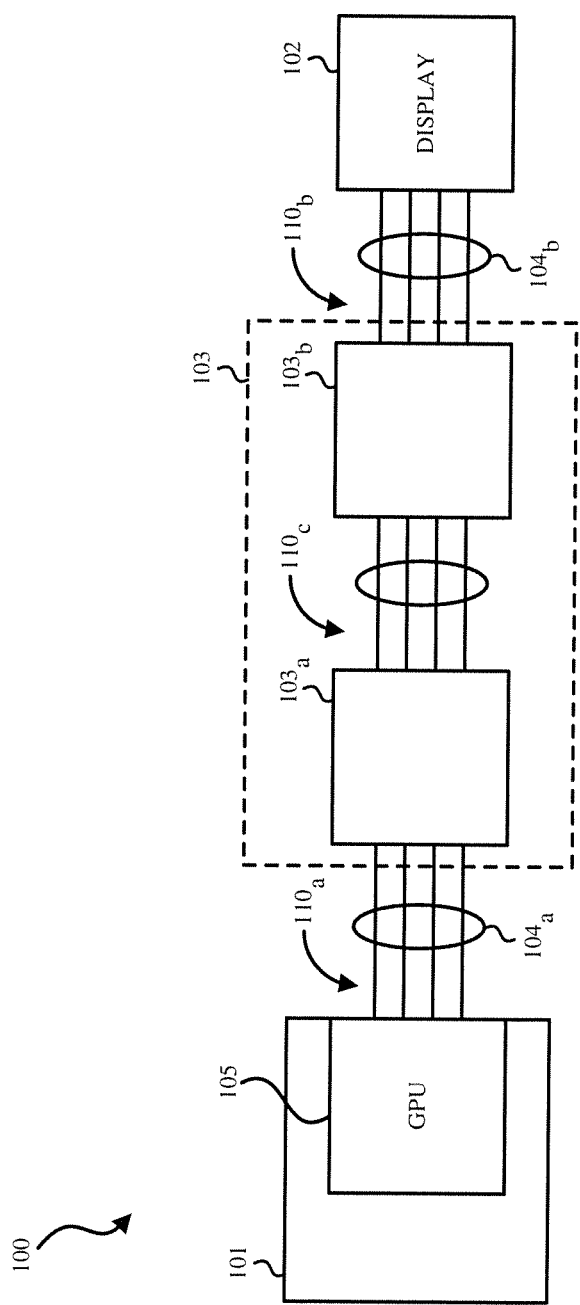
FIG. 1 is a block diagram illustrating a DisplayPort source device, a DisplayPort sink device, and an intermediate device connecting the source and sink devices, according to an example embodiment.

Several embodiments are now explained with reference to the appended drawings. Whenever aspects are not explicitly defined, the embodiments are not limited only to the parts shown, which are meant merely for the purpose of illustration. Also, while numerous details are set forth, it is understood that some embodiments may be practiced without these details. In other instances, well-known circuits, structures, and techniques have not been shown in detail so as not to obscure the understanding of this description.

There are cases in which an intermediate device that uses a protocol other than DisplayPort for data traffic is provided in between DisplayPort source and sink devices. In these cases, the intermediate device converts traffic from the DisplayPort source device to its own protocol and then converts the traffic back to DisplayPort protocol to send to the DisplayPort sink device. Accordingly, two DisplayPort connections exist between the source device and the sink device, a first between the source device and the intermediate device (a local link) and a second between the intermediate device and the sink device (a remote link).

The inventors herein have recognized that DisplayPort protocol does not provide for management of both DisplayPort connections (the local and remote links) and the source device and sink device are unaware that an intermediate device exists between them. Typically, during link training, the source device manages the local link without knowledge of the remote link and the remote link is managed by the intermediate device. This results in potential problems (e.g., inefficiency, system failure, etc.) when a link is of insufficient quality, if a connection cable is too long or some electrical interruption occurs.

An aspect of the disclosure herein aims to provide information to the source device during link training regarding the state of the remote link when an intermediate device using a different protocol is connected between the source and sink device. State information regarding the remote link may be provided by a state machine that stores data to a register on the intermediate device. The state information may indicate success or failure of link training performed on the remote link, or that link training is currently being performed on the remote link. The state information may also include any other information regarding actions taking by the intermediate device on the remote link. Based on the state of the remote link, the source device is able to generate a representation of the end to end link between the source and sink device, and to perform link training accordingly.

By virtue of the arrangements disclosed herein, it is typically possible to perform link training where the number of available lanes and the transmission bit rate for a local link are configured to be symmetrical to the number of available lanes and the transmission bit rate for a remote link. As such, it is possible to avoid a situation in which the number of available lanes and the transmission bit rate for a local link do not match the number of available lanes and the transmission bit rate for a remote link.

FIG. 1 illustrates a system 100 including a DisplayPort source device 101, a DisplayPort sink device 102, and an intermediate device 103 including controller 103a and controller 103b connected by a cable, according to an example embodiment. The DisplayPort device 101 can be, for example, a computer including a GPU (graphics processing unit) 105. The computer may also include a main control unit such as a CPU (not shown), and a storage unit (not shown) including a ROM (Read Only Memory) and a RAM (Random Access Memory). These components can be connected by a bus or the like and controlled when the main control unit executes programs stored in the storage unit. The DisplayPort sink device 102 can be, for example, a display device such as a monitor, projector, television, etc. The DisplayPort sink device 102 displays a received digital signal, the digital signal being sent by the DisplayPort source device 101. In this regard, the data to be communicated between the DisplayPort source device 101 and the DisplayPort sink device 102 may include video data traffic, video compression data or other graphics data.

The intermediate device 103 includes, for example, a cable 110c that connects controller 103a and controller 103b. Controller 103a connects to the DisplayPort source device 101 via a local link 104a including one or more data lanes 110a. Controller 103b connects the intermediate device 103 to the DisplayPort sink device 102 via a remote link 104b including one or more data lanes 110b. The number of data lanes 110a and/or bandwidth used in the local link 104a and the number of data lanes 110b and/or bandwidth used in the remote link 104b, are determined by the DisplayPort 101 as described in more detail below in connection with FIG. 3.

The intermediate device 103 transfers data using a different protocol than the DisplayPort source device 101 and the DisplayPort sink device 102, such that data traffic received from source device 101 by controller 103a is converted from DisplayPort protocol to the protocol used by the intermediate device 103 and then back to DisplayPort protocol for transmission by controller 103b to the DisplayPort sink device 102.

The intermediate device 103 includes a state machine that generates state information regarding the remote link and stores the state information to a register on the intermediate device. In particular, the register storing the state information may be included in the controller 103b connected to the DisplayPort sink device 102. The state information may indicate success or failure of link training performed on the remote link, or that link training is currently being performed on the remote link. The state information may also include any other information regarding actions taking by the intermediate device on the remote link. DisplayPort source device 101 accesses the state information in the register of the intermediate device 103 and generates a representation of the end to end link between the source and sink device to perform link training as described in more detail below in connection with FIG. 3.

Figure 2:
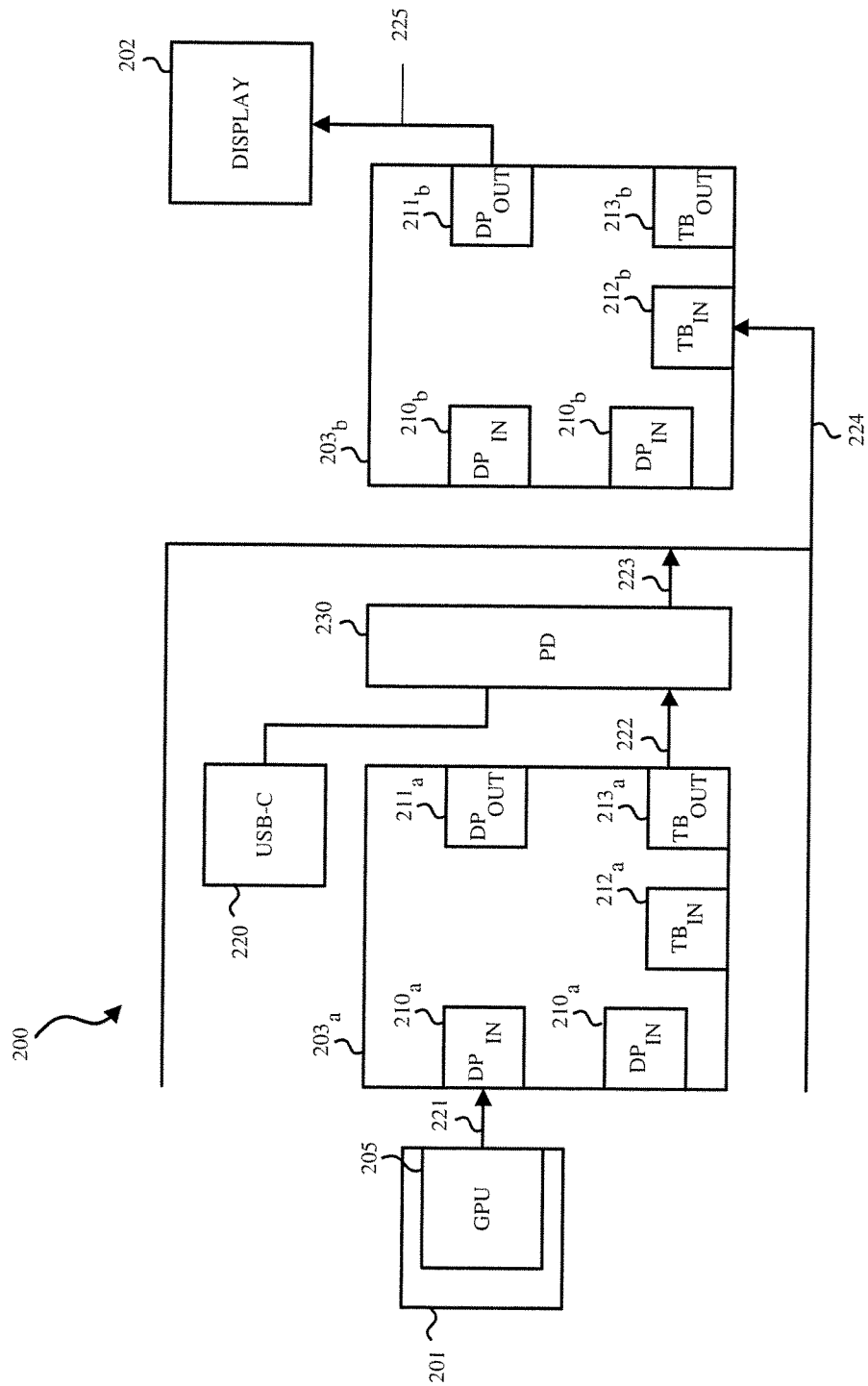
FIG. 2 is a block diagram illustrating a DisplayPort source device, a DisplayPort sink device, and an intermediate device connecting the source and sink devices using Thunderbolt interface connections, according to another example embodiment.

FIG. 2 illustrates one example embodiment in which intermediate device 103 uses Thunderbolt protocol and includes two Thunderbolt integrated circuits (ICs) connected by a cable. Generally, Thunderbolt combines PCI Express (PCIe) and DP into one serial signal, and additionally can provide DC power, in one cable. The cable can be, for example, copper-based or made up of optical fiber. Thunderbolt controllers (e.g., ICs 203a and 203b) can multiplex one or more individual data lanes from connected PCIe and DisplayPort devices (e.g., DisplayPort source device 201) for transmission via one duplex Thunderbolt lane, then de-multiplex them for use by PCIe and DisplayPort devices (e.g., DisplayPort sink device 202) on the other end. A single Thunderbolt port can support, for example, up to six Thunderbolt devices via hubs or daisy chains. It will be understood that in other embodiments, the intermediate device may use any protocol suitable for transferring video data traffic, video compression data or other graphics data.

Referring to FIG. 2, FIG. 2 shows a system 200 including a DisplayPort source device 205, a DisplayPort sink device 202, and an intermediate device including Thunderbolt IC 203a and Thunderbolt IC 203b connected by a cable. Similar to FIG. 1, the DisplayPort device 201 can be, for example, a computer including a GPU (graphics processing unit) 205. The computer may also include a main control unit such as a CPU (not shown), and a storage unit (not shown) including a ROM (Read Only Memory) and a RAM (Random Access Memory). These components can be connected by a bus or the like and controlled when the main control unit executes programs stored in the storage unit. The DisplayPort sink device 202 can be, for example, a display device such as a monitor, projector, television, etc. In one example embodiment, the DisplayPort sink device may be a Thunderbolt display including an integrated Thunderbolt port. The DisplayPort sink device 202 displays a received digital signal, the digital signal being sent by the DisplayPort source device 201. In this regard, the data to be communicated between the DisplayPort source device 201 and the DisplayPort sink device 202 may include video data traffic, video compression data or other graphics data.

The cable may be a Thunderbolt cable that connects Thunderbolt IC 203a and Thunderbolt IC 203b. Thunderbolt IC 203a includes one or more DPin ports 210a for receiving incoming DisplayPort signals, and one or more DPout ports 211a for sending data. Thunderbolt IC 203b also includes one or more DPin ports 210b, and one or more DPout ports 211b. Thunderbolt IC 203a further includes a TBin port 212a and a TBout port 213a, and Thunderbolt IC 203b further includes a TBin port 212b and a TBout port 213b.

As shown in FIG. 2, Thunderbolt IC 203a connects to the DisplayPort source device 201 via a local link 221 through DPin port 210a. The local link 221 is formed of one or more data lanes. Thunderbolt IC 203b connects to the DisplayPort sink device 202 via a remote link 225 through DPout port 211b. The remote link 225 is formed of one or more data lanes.

When sending data from the DisplayPort source device 201, Thunderbolt IC 203a converts the DisplayPort traffic being received at DPin port 210a, to Thunderbolt traffic and sends the Thunderbolt traffic via TBout port 213a to Thunderbolt IC 203b. Thunderbolt IC 203b receives the Thunderbolt traffic via TBin port 212b. Thunderbolt IC 203b then converts the received Thunderbolt traffic to DisplayPort traffic, and sends the DisplayPort traffic via the DPout port 211b to the DisplayPort sink device 202.

Thunderbolt IC 203b includes a state machine that generates state information regarding the remote link and stores the state information to a register on Thunderbolt IC 203b. The state information may indicate success or failure of link training performed on the remote link, or that link training is currently being performed on the remote link. The state information may also include any other information regarding actions taking by the intermediate device on the remote link. DisplayPort source device 101 accesses the state information in the register of Thunderbolt IC 203b and generates a representation of the end to end link between the source and sink device to perform link training as described in more detail below in connection with FIG. 3.

In the embodiment shown in FIG. 2, a power domain controller (PD) 230 is provided to negotiate at the DisplayPort sink device 202 what type of a cable is plugged in, for example, a Thunderbolt cable, a USB-C cable 220, or a DisplayPort cable, or something else. In this embodiment, Thunderbolt IC 203a connects through the PD 230 via interface connections 222, 223 and 224. In other embodiments, Thunderbolt IC 203a is connected directly to Thunderbolt IC 203b without the use of a power domain controller.

Figure 3:
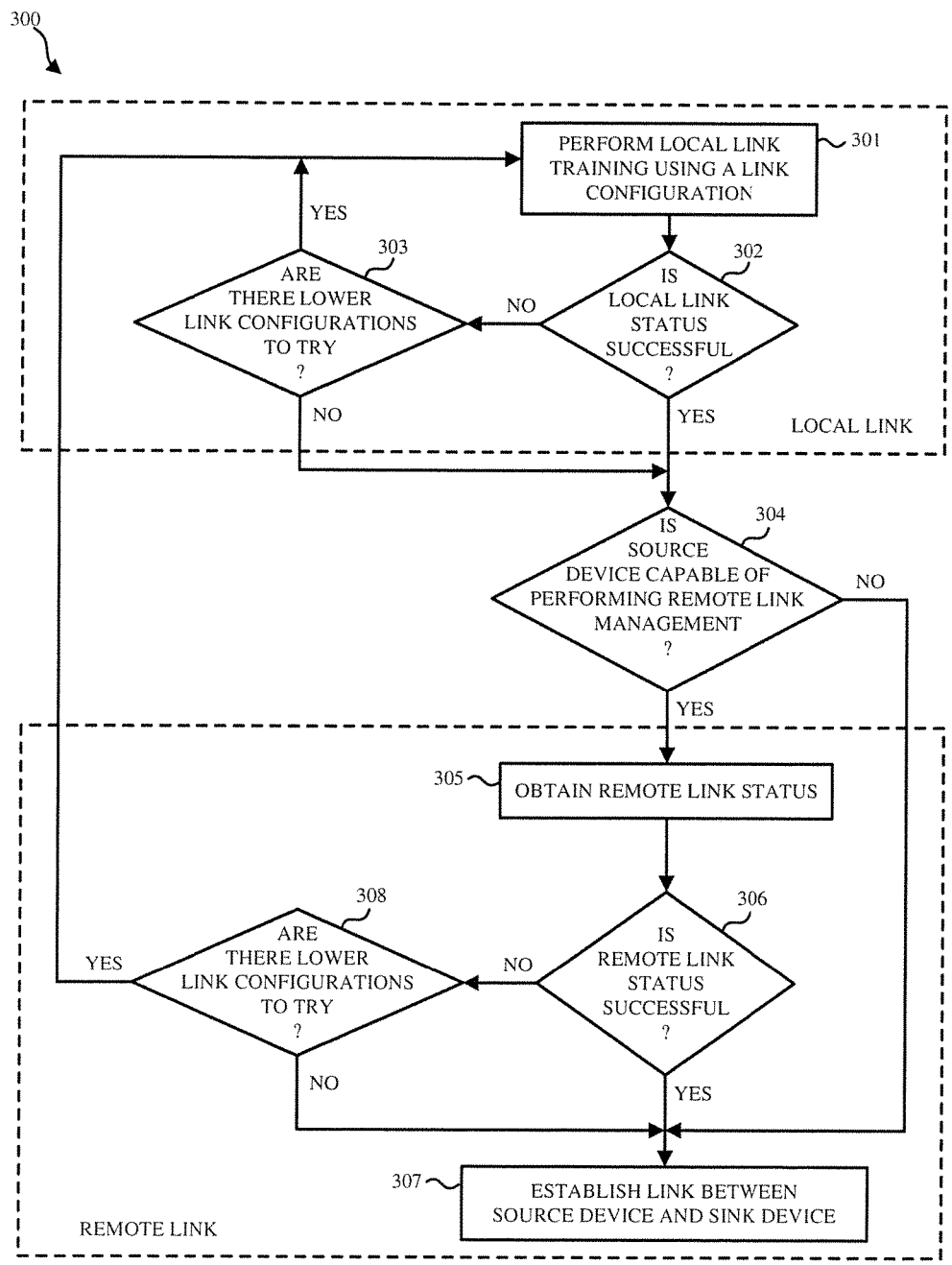
FIG. 3 illustrates a flow diagram of an example process for synchronous link training on the DisplayPort source device and the DisplayPort sink device of FIG. 1 or FIG. 2.

FIG. 3 illustrates a flow diagram of an example process for synchronous link training on a DisplayPort source device (e.g., 101 or 201) and a DisplayPort sink device (e.g., 102 or 202), each of which are connected to an intermediate device (e.g., 103 or 203a and 203b). The DisplayPort source device is connected to the intermediate device through a local link and the DisplayPort sink device is connected to the intermediate device through a remote link. The following embodiments may be described as a process 300, which is usually depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a procedure, etc.

Process 300 may be performed by processing logic that includes hardware (e.g. circuitry, dedicated logic, etc.), software (e.g., embodied on a non-transitory computer readable medium), or a combination thereof. In one example embodiment, process 300 is executed by a software driver of a GPU (e.g., GPU 105 or 205) executing on a CPU of the DisplayPort source device.

Referring to FIG. 3, at block 301, the DisplayPort source device performs local link training on the local link using a link configuration. The link configuration may be selected, based on, for example, a number of available lanes (e.g., data lanes 104a) and a bit rate of each lane. As one example a first link configuration used at block 301 may be, for example, a configuration having a highest available link bandwidth.

At block 302, the DisplayPort source device obtains a local link status of the local link. The local link status comprises information about whether a requested lane count and bit rate have been set or locked. Based on the obtained local link status, the DisplayPort source device determines whether the local link status indicates a successful training. If it is determined at block 302 that the local link status indicates that the local link status is successful, then block 304 is performed by the DisplayPort source device, as described below. If, however, it is determined at block 302 that the local link status indicates that the local link training is not successful, then, at block 303, the DisplayPort source device determines whether there are lower bandwidth link configurations available for local link training. This determination is based on, for example, a number of available lanes (e.g., data lanes 104a) and a bit rate of each lane.

If it is determined at block 303 that lower bandwidth link configurations are not available, then the DisplayPort source device performs block 304 as described below. If, on the other hand, it is determined at block 303 that there are lower bandwidth link configurations available, then, at block 301, the DisplayPort source device performs the local link training using a second link configuration having a lower bandwidth than the first link configuration. After performing the local link training using the second link configuration, at block 302, the DisplayPort source device again obtains the local link status of the local link. If the local link status indicates that the local link training is successful at block 302, then the DisplayPort source device performs block 304.

At block 304, the DisplayPort source device determines whether it is capable of performing remote link management. This determination is based on, for example, whether the platform of the DisplayPort source device supports remote link management. If it is determined at block 304 that the DisplayPort source device is not capable of performing remote link management, then the DisplayPort source device performs block 307. Here, if a working DisplayPort link configuration was not found, then the DisplayPort sink device is kept in an off state.

If it is determined at block 304 that the DisplayPort source device is capable of performing remote link management, then, at block 305, remote link management is performed and the DisplayPort source device obtains a remote link status based on state information stored in a register of the intermediate device. This includes polling the DisplayPort sink device until the state information is raised. The polling is conducted for a predefined time before timing out. The state information of the remote link includes information indicating that link training is being performed on the remote link, that link training on the remote link has succeeded, or that link training on the remote link has failed. The state information may also include any other information regarding actions taking by the intermediate device on the remote link. The remote link status comprises information about whether a requested lane count and bit rate have been set or locked.

In an alternative embodiment, in block 305, instead of polling, the state information can be raised based on a vendor specific DisplayPort interrupt request (IRQ).

At block 306, based on the remote link status obtained at block 305, the DisplayPort source device determines whether the remote link status indicates that remote link training is successful. If it is determined at block 306 that the remote link status indicates that remote link training is not successful, then, at block 308, the DisplayPort source device determines whether there are any lower bandwidth link configurations available for link training. If it is determined at block 308 that there are available lower bandwidth configurations available, then the process returns to block 301, in which local link training is performed using the second link configuration having a lower bandwidth than the first link configuration.

If it is determined at block 308 that lower bandwidth configurations are not available, then the DisplayPort source device performs block 307. Here, if a working DisplayPort link configuration was not found, then the DisplayPort sink device is kept in an off state.

If at block 306, it is determined that the remote link status indicates that the remote link training is successful, then, at block 307, the DisplayPort source device establishes a link between the DisplayPort source device and the DisplayPort sink device using the first link configuration or the second link configuration, depending on which link configuration was indicated as successfully trained at both the local link and the remote link. Accordingly, by virtue of process 300, it is typically possible to perform link training in which the number of available lanes and the transmission bit rate for a local link are configured to be symmetrical to the number of available lanes and the transmission bit rate for a remote link. As such, it is possible to avoid a situation in which the number of available lanes and the transmission bit rate for the local link do not match the number of available lanes and the transmission bit rate for the remote link.

In some embodiments, at block 307, driver software for the DisplayPort source device uses an application program interface (API) to configure the link between the DisplayPort source device and the DisplayPort sink device. As one example, an API may include data relating to one or more link configurations, including a number of configurations that are currently considered valid and a memory allocation of the link configuration data. As another example, an API may include a command to prepare a valid link configuration, including a list of verified entries. As a further example, an API may include a command to reserve resources for a link configuration that has been validated, a command to release the resources and a command to set the link configuration parameters. In one embodiment, driver software for the DisplayPort source device performs all or a portion of the blocks 304 to 307. In other embodiments, driver software for the DisplayPort source device performs all of process 300.

Figure 4:
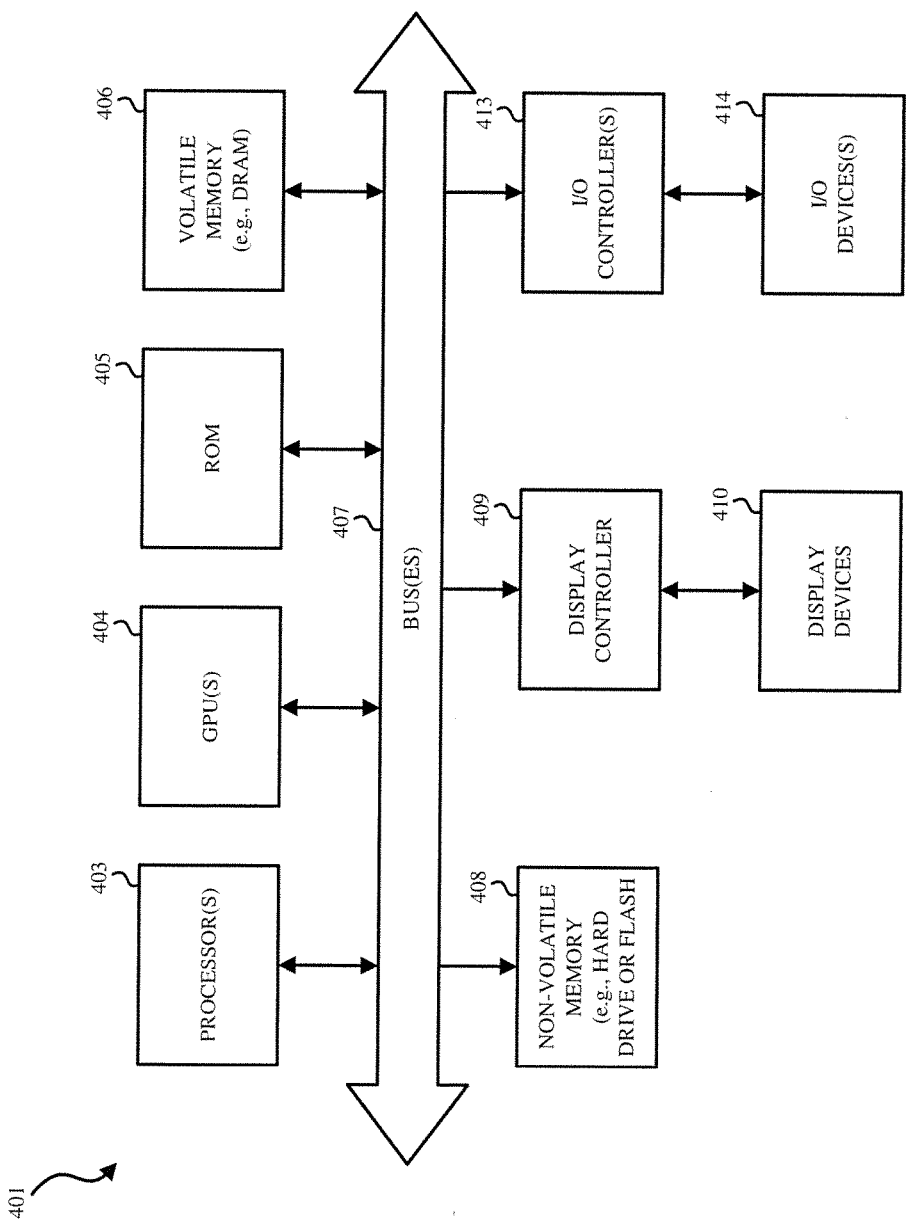
FIG. 4 illustrates a block diagram for explaining a data processing system which can be used with one or more embodiments described herein.

Referring to FIG. 4, FIG. 4 is a block diagram for explaining an example of a data processing system hardware which may be used with any of the embodiments described herein. This data processing system can represent a general purpose computer system or a special purpose computer system. Note that while FIG. 4 illustrates the various components of a data processing system that may be incorporated into a mobile or handheld device, it is not intended to represent any particular architecture or manner of interconnecting the components as such details are not germane to the embodiments herein. It will also be appreciated that other types of data processing systems that have fewer components than shown or more components than shown in FIG. 4 can also be used.

As shown in FIG. 4, the data processing system 401 includes one or more buses 407 that serve to interconnect the various components of the system. One or more processors 403 and one or more graphics processing units (GPUs) are coupled to each other through the one or more buses 407 as is known in the art. The processors may be microprocessors or special purpose processors, such as a processor created through an Application Specific Integrated Circuit (ASIC). Read Only Memory (ROM) 405, volatile memory 406 and non-volatile memory 408 are coupled to the one or more buses 407 using techniques known in the art. Volatile memory 406 may be DRAM. Non-volatile memory 408 may be a hard disk drive or a flash memory or a magnetic optical drive or magnetic memory or an optical drive or other types of memory systems that maintain data even after power is removed from the system. In one embodiment, the processor 403 retrieves computer program instructions stored in a machine readable storage medium such as the ROM 405, the volatile memory 406 or the non-volatile memory 408 or a combination of those memories and executes those instructions to perform operations described herein. A display controller 409 is coupled to the one or more buses 407 in order to receive display data to be displayed on display device(s) 410. In other embodiments, the display controller 409 is coupled directly to GPU 404. The display device(s) 410 can include an integrated touch input to provide a touch screen. The data processing system can also include one or more input/output (I/O) controllers 413 which provide interfaces for one or more I/O devices 414, such as one or more mice, touch screens, touch pads, joysticks, and other input devices including those known in the art and output devices (e.g. speakers). The input/output devices 414 are coupled through one or more I/O controllers 413 as is known in the art.

While FIG. 4 shows that the non-volatile memory 408 and the volatile memory 406 are coupled to the one or more buses directly rather than through a network interface, it will be appreciated that the embodiments disclosed herein can utilize non-volatile memory that is remote from the system, such as a network storage device which is coupled to the data processing system through a network interface such as a modem or Ethernet interface. The buses 407 can be connected to each other through various bridges, controllers and/or adapters as is well known in the art. In one embodiment the I/O controller 413 includes one or more of a USB (Universal Serial Bus) adapter for controlling USB peripherals, an IEEE 1394 controller for IEEE 1394 compliant peripherals, or a Thunderbolt controller for controlling Thunderbolt peripherals. In one embodiment, one or more network device(s) can be coupled to the bus(es) 407. The network device(s) can be wired network devices (e.g., Ethernet) or wireless network devices (e.g., WI-FI, Bluetooth).

In the embodiment of the DisplayPort source device in the form of a computer, data processing system 401 may be a computer that is generally portable (such as laptop, notebook, tablet, and handheld computers), as well as a computer that is generally used in one place (such as conventional desktop computers, workstations, and servers).

The DisplayPort source device may also take the form of other types of devices, such as mobile telephones, media players, personal data organizers, handheld game platforms, cameras, and/or combinations of such devices. For instance, the DisplayPort source device may be provided in the form of a handheld electronic device that includes various functionalities (such as the ability to take pictures, make telephone calls, access the Internet, communicate via email, record audio and/or video, listen to music, play games, connect to wireless networks, and so forth).

In another embodiment, the DisplayPort source device may also be provided in the form of a portable multi-function tablet computing device. In certain embodiments, the tablet computing device may provide the functionality of media player, a web browser, a cellular phone, a gaming platform, a personal data organizer, and so forth.

It will be apparent from this description that various embodiments may be embodied, at least in part, in software. That is, the techniques may be carried out in a data processing system in response to its processor executing a sequence of instructions contained in a storage medium, such as a non-transitory machine-readable storage medium (e.g. DRAM or flash memory). In various embodiments, hardwired circuitry may be used in combination with software instructions to implement the techniques described herein. Thus the techniques are not limited to any specific combination of hardware circuitry and software, or to any particular source for the instructions executed by the data processing system. Moreover, it will be understood that where mobile or handheld devices are described, the description encompasses mobile devices (e.g., laptop devices, tablet devices), handheld devices (e.g., smartphones), as well as embedded systems suitable for use in wearable electronic devices.

In the description, certain terminology is used to describe features of various embodiments. For example, in certain situations, the terms "component," "unit," "module," and "logic" are representative of hardware and/or software configured to perform one or more functions. For instance, examples of "hardware" include, but are not limited or restricted to an integrated circuit such as a processor (e.g., a digital signal processor, microprocessor, application specific integrated circuit, a micro-controller, etc.). Of course, the hardware may be alternatively implemented as a finite state machine or even combinatorial logic. An example of "software" includes executable code in the form of an application, an applet, a routine or even a series of instructions. The software may be stored in any type of machine-readable medium.

While certain embodiments have been described and shown in the accompanying drawings, it is to be understood that such embodiments are merely illustrative of and not restrictive, and the embodiments are not limited to the specific constructions and arrangements shown and described, since various other modifications may occur to those of ordinary skill in the art. The description is thus to be regarded as illustrative instead of limiting.

The invention claimed is:

1. A method for link training implemented by a source device, the source device being connected to an intermediate device through a local link and a sink device connected to the intermediate device through a remote link, wherein the intermediate device uses a different protocol than the source device and the sink device for communicating data, the method comprising:
    performing local link training on the local link using a first link configuration;
    obtaining a local link status of the local link;
    if the local link status indicates that the local link training is not successful, performing the local link training using a second link configuration having a lower bandwidth than the first link configuration, and obtaining the local link status of the local link;
    if the local link status indicates that the local link training is successful, performing remote link management of the remote link,
    wherein the remote link management comprises:
        obtaining a remote link status based on state information stored in a register of the intermediate device;
        determining that the remote link status indicates that remote link training is not successful, and performing the remote link training using the second link configuration; and
        establishing a link between the source device and the sink device using the second link configuration.

2. The method of claim 1 wherein the intermediate device comprises a first controller and a second controller connected by a cable, and wherein the first controller is connected to the source device and the second controller is connected to the sink device.

3. The method of claim 1 wherein the source device is a DisplayPort source device and the sink device is a DisplayPort sink device.

4. The method of claim 1 wherein the state information of the remote link comprises information indicating that link training is being performed on the remote link, that link training on the remote link has succeeded, or that link training on the remote link has failed.

5. The method of claim 1 wherein the local link status and remote link status comprise information about whether a requested lane count and bit rate have been set.

6. The method of claim 1 wherein the remote link management further comprises determining whether the source device is capable of performing remote link management.

7. The method of claim 1 wherein the data to be communicated comprises video compression data.

8. The method of claim 1 wherein the source device comprises a GPU and a CPU, the GPU having a driver being executed on the CPU, and wherein the driver uses an application programming interface (API) comprising a command for preparing a link training configuration, a command for binding configuration resources, a command for releasing configuration resources and a command to set configuration resources.

9. A source device, the source device being connected to an intermediate device through a local link and a sink device being connected to the intermediate device through a remote link, wherein the intermediate device uses a different protocol than the source device and the sink device for communicating data, the source device comprising:
    a GPU (graphics processing unit) having a driver; and a CPU (central processing unit) on which the driver is executed to:
        perform local link training on the local link using a first link configuration;
        obtain a local link status of the local link;
        if the local link status indicates that the local link training is not successful, perform the local link training using a second link configuration having a lower bandwidth than the first link configuration, and obtain the local link status of the local link;
        if the local link status indicates that the local link training is successful, perform remote link management of the remote link,
    wherein the remote link management comprises:
        obtaining a remote link status based on state information stored in a register of the intermediate device;
        determining that the remote link status indicates that remote link training is not successful, and performing the remote link training using the second link configuration; and
        establishing a link between the source device and the sink device using the second link configuration.

10. The source device of claim 9 wherein the source device is a DisplayPort source device and the sink device is a DisplayPort sink device.

11. The source device of claim 9 wherein the intermediate device comprises a first controller and a second controller connected by a cable, wherein the first controller is connected to the source device and the second controller is connected to the sink device.

12. The source device of claim 9 wherein the state information of the remote link comprises information indicating that link training is being performed on the remote link, that link training on the remote link has succeeded, or that link training on the remote link has failed.

13. The source device of claim 9 wherein the local link status and remote link status comprise information about whether a requested lane count and bit rate have been set.

14. The source device of claim 9 wherein the remote link management further comprises determining whether the source device is capable of performing remote link management.

15. The source device of claim 9 wherein the data to be communicated comprises video compression data.

16. The source device of claim 9 wherein the driver uses an application programming interface (API) comprising a command for preparing a link training configuration, a command for binding configuration resources, a command for releasing configuration resources and a command to set configuration resources.

17. A non-transitory computer-readable storage medium storing executable program instructions which when executed by a data processing system cause the data processing system to perform a method for link training implemented by a source device, the source device being connected to an intermediate device through a local link and a sink device connected to the intermediate device through a remote link, wherein the intermediate device uses a different protocol than the source device and the sink device for communicating data, the method comprising:
    performing local link training on the local link using a first link configuration; obtaining a local link status of the local link;

if the local link status indicates that the local link training is not successful, performing the local link training using a second link configuration having a lower bandwidth than the first link configuration, and obtaining the local link status of the local link;

if the local link status indicates that the local link training is successful, performing remote link management of the remote link, wherein the remote link management comprises:
- obtaining a remote link status based on state information stored in a register of the intermediate device;
- determining that the remote link status indicates that remote link training is not successful, and performing the remote link training using the second link configuration; and
- establishing a link between the source device and the sink device using the second link configuration.

18. The non-transitory computer-readable storage medium of claim 17 wherein the intermediate device comprises a first controller and a second controller connected by a cable, and wherein the first controller is connected to the source device and the second controller is connected to the sink device.

19. The non-transitory computer-readable storage medium of claim 17 wherein the source device is a DisplayPort source device and the sink device is a DisplayPort sink device.

20. The non-transitory computer-readable storage medium of claim 17 wherein the state information of the remote link comprises information indicating that link training is being performed on the remote link, that link training on the remote link has succeeded, or that link training on the remote link has failed.

21. The non-transitory computer-readable storage medium of claim 17 wherein the local link status and remote link status comprise information about whether a requested lane count and bit rate have been set.

22. The non-transitory computer-readable storage medium of claim 17 wherein the remote link management further comprises determining whether the source device is capable of performing remote link management.

23. The non-transitory computer-readable storage medium of claim 17 wherein the data to be communicated comprises video compression data.

24. The non-transitory computer-readable storage medium of claim 17 wherein the source device comprises a GPU and a CPU, the GPU having a driver being executed on the CPU, and wherein the driver uses an application programming interface (API) comprising a command for preparing a link training configuration, a command for binding configuration resources, a command for releasing configuration resources and a command to set configuration resources.

* * * * *